Sept. 3, 1929.  A. AUMÉTEYER ET AL  1,727,190
ENGINE PISTON
Filed Oct. 27, 1927    2 Sheets-Sheet 1

Inventors:
Alfred Auméteyer & François Piazzoli
By Mauro & Lewis
Attorneys

Sept. 3, 1929.   A. AUMETEYER ET AL   1,727,190
ENGINE PISTON
Filed Oct. 27, 1927     2 Sheets-Sheet 2
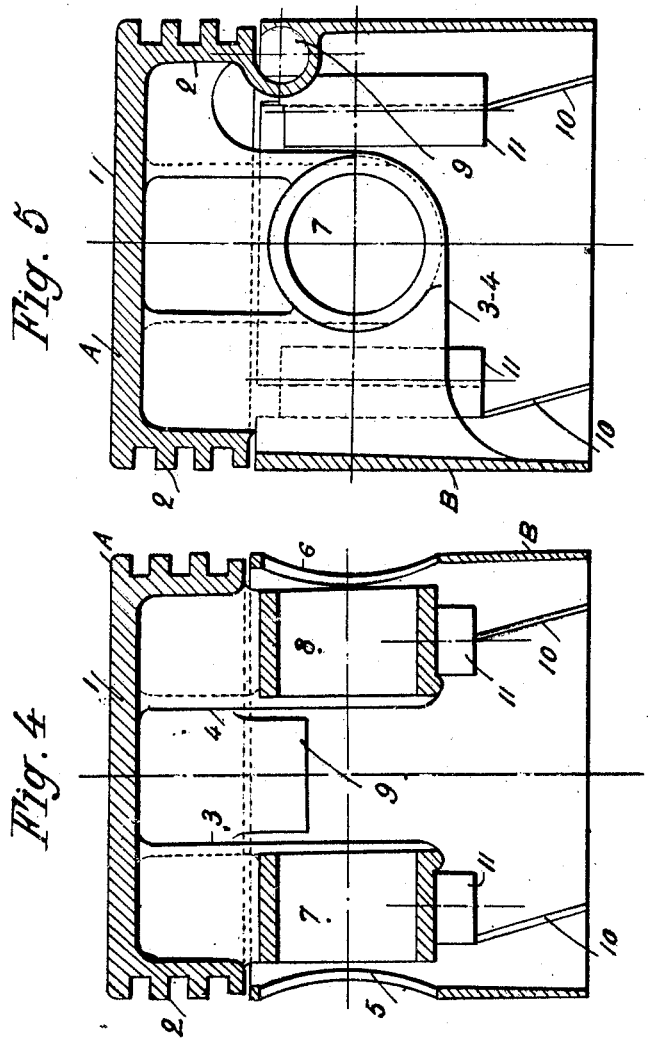
Inventors:-
Alfred Aumeteyer & François Piazzoli
By Mauro & Lewis
Attorneys Patented Sept. 3, 1929.

1,727,190

UNITED STATES PATENT OFFICE.

ALFRED AUMÉTEYER AND FRANÇOIS PIAZZOLI, OF PARIS, FRANCE.

ENGINE PISTON.

Application filed October 27, 1927, Serial No. 229,163, and in France September 8, 1927.

The present invention has for its object a piston for an engine cylinder.

This piston is characterized essentially by the combination of a head having the customary means for rendering it gas-tight with an elastic hollow cylindrical portion, these two elements being preferably combined in an elastic manner.

On account of this elasticity of the hollow cylindrical portion and elasticity of the junction between this latter and the piston head, a piston is produced which: (1) can be mounted so as to act without appreciable play, thus avoiding all knocking against the walls of the cylinder, and (2) can act at all speeds without risk of seizure by expansion of the metal.

The elasticity of the hollow cylindrical portion is attained by the division of this latter by longitudinal slots which divide it into segments connected together by tubular bosses, or the like. The hollow cylindrical portion may present a continuous undulating form when the number of these bosses becomes large.

The elastic junction of the piston head to the hollow cylindrical portion is effected by means of ribs or brackets connected to the piston head and to a part of the hollow cylindrical portion. One or more tubular bosses can be provided in addition at any appropriate points between the piston head and the cylindrical portion in order to render this junction more secure.

In the accompanying drawings which show by way of example a mode of carrying the invention into effect.

Figures 3 and 4 show vertical sections through II—II of Figure 2 (one looking towards the left and the other towards the right).

Figure 5 shows a vertical section through III—III of Figure 2.

Figure 1:
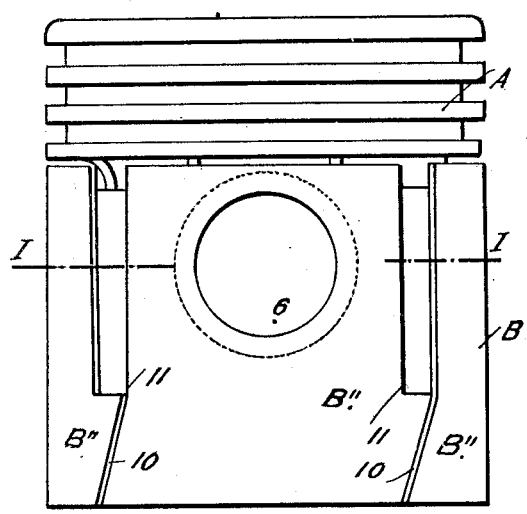
Figure 1 shows the piston in elevation.
Figure 3:
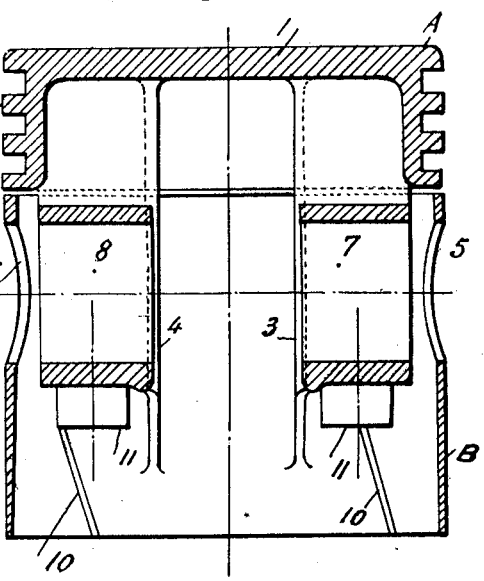

The piston is cast in a single piece and consists of any appropriate metal or alloy, cast iron, aluminium, alpax or the like. It comprises a piston head A and a cylindrical part B, the former having a surface 1 intended to receive the pressure and a cylindrical portion 2 which carries the piston rings and scrapers (not illustrated); and the latter acting as a guide and to secure the bearing of the whole on the walls of the cylinder.

The piston head A is connected to one of the parts or segments B' of the cylindrical portion B by two symmetrical ribs 3 and 4 forming brackets and both resting on the base of the cylinder 1 and on a similar portion B' of the cylindrical portion B included between two opposite holes 5 and 6. These two ribs 3 and 4 carry perpendicular to their plane bosses 7 and 8 for the gudgeon pin of the piston and the connecting rod.

The attachment of the head A to the cylindrical portion B can be completed by means of a flexible or elastic boss 9 the position of which is diametrically opposite to the portion B' of the cylindrical part on which the ribs 3 and 4 are attached, and which is so shaped as not to counteract the elasticity of the portion B'.

Figure 2:
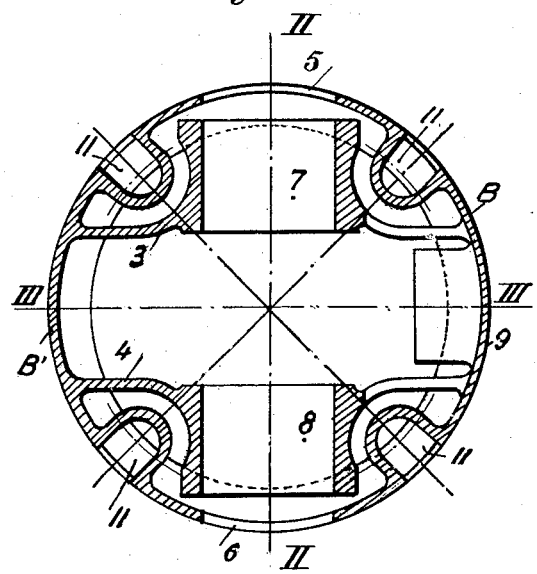
Figure 2 shows a horizontal section through I—I of Figure 1.

The cylindrical portion B is divided into four segments B'' by four slots 10 opposed two by two and extending throughout its whole length, and the four segments thus constituted are connected two by two for part of their length by tubular bosses 11 situated across each one of the slots 10 as shown clearly in Figures 1 and 2. As is shown one of the edges of each boss 11 is rigidly attached to one of the sectors B'' while the neighboring sector is rigidly connected to the other edge of the same boss. This arrangement assures the elasticity of the cylindrical portion, and allows changes of diameter of this latter to take place throughout the length of the guiding portion of the piston.

It will be observed that one and one only of the segmental parts (part B') of the cylindrical skirt of the piston is rigidly attached to the head A by means of the ribs 3 and 4 which carry the bosses 7 and 8 for the gudgeon pin of the connection rod, the adjacent segments B'' of said skirt being attached to part B' by means of the elastic connections 11. Bosses 7 and 8 are thus independent of all the segments of the cylindrical skirt except segment B', in the sense that the force transmitted through the piston rod does not act upon the flexible skirt, the entire effort thereof being carried by the ribs 3, 4 and head A. This is regarded as an important feature of the invention.

It will be understood that the number of slots 10 and of the tubular bosses 11 can be varied at will according to the degree of elasticity which it is desired to obtain and to the extent allowed by the construction of the piston.

With a large number of slots and bosses the cylindrical portion B may present an undulating shape.

What we claim is:

1. An engine piston having a cylindrical piston head, a cylindrical flexible body for said head, a plurality of ribs interconnecting said head and said body and a boss interconnecting said head and said body at a point diametrically opposite said ribs.

2. An engine piston having a cylindrical piston head, a cylindrical body for said head, a plurality of slots dividing said body into segmental portions, a U-shaped boss interconnecting adjacent edges of each slot, a plurality of ribs interconnecting said head and said body and a boss interconnecting said head and said body at a point diametrically opposite said ribs.

3. An engine piston having a cylindrical piston head, a cylindrical body for said head, a plurality of slots dividing said body into segmental portions, abutting members formed at the extremity of said slots, a U-shaped boss interconnecting adjacent edges of each slot above said abutting members, a plurality of ribs interconnecting said head and said body and a boss interconnecting said head and said body at a point diametrically opposite said ribs.

4. An engine piston comprising a piston head and an expansible body divided into a plurality of segments, one segment being rigidly connected with the head by elements which also carry the bosses for the gudgeon pin, and the other segments being connected to each other and to the first named segment by flexible connections.

5. An engine piston comprising a piston head and an expansible cylindrical body divided into a plurality of segments connected together by flexible connections, one of said segments being rigidly connected with said piston head by a plurality of ribs, said ribs carrying the bosses for the gudgeon pin of the connection rod.

6. An engine piston comprising a piston head, a cylindrical flexible segmental body, a plurality of ribs rigidly connecting one segment of the body with said head, and a flexible boss elastically connecting another segment with said head.

7. An engine piston comprising a piston head, a cylindrical body divided by slots into a plurality of segments interconnected by means of flexible connections, ribs rigidly connecting one of said segments with said head, bosses for the gudgeon pin carried by said ribs, and a flexible connection between the head and body at a point approximately opposite said ribs.

In testimony whereof we have affixed our signatures.

ALFRED AUMÉTEYER.
FRANÇOIS PIAZZOLI.